United States Patent Office 3,382,205
Patented May 7, 1968

3,382,205
COMPOSITIONS CONTAINING SILANOL CHAIN-STOPPED POLYDIMETHYL-SILOXANE, ORGANOSILICON PROCESS AID, AND CURING AGENT
Melvin D. Beers, Latham, N.Y., assignor to General Electric Company, a corporation of New York
No Drawing. Filed Sept. 27, 1963, Ser. No. 312,011
7 Claims. (Cl. 260—37)

The present invention relates to certain fluid organopolysiloxane compositions curable at room temperature to the elastomeric state. More particularly, the present invention relates to organopolysiloxane compositions comprising a mixture of an organotriacyloxysilane and a base mixture comprising organosiloxane having chemically combined organosiloxy units.

The development of fluid organopolysiloxane compositions curable at room temperature to the elastomeric state has greatly extended the utility of organopolysiloxane elastomers. These curable fluid compositions consisting of a curing agent such as an organotriacyloxysilane and base mixture can be furnished by the manufacturer in a single container, such as a tube. The fluid composition is converted directly to the elastomeric state by exposing it to moisture such as present in the atmosphere. Two package fluid organopolysiloxane compositions curable to the elastomeric state at room temperature also are available in which a curing catalyst is furnished separately from a base mixture. The two packages organopolysiloxane compositions are converted to the elastomeric state when the catalyst is incorporated into the base mixture.

The advantages achieved by employing the one package mixture are particularly evident in various sealing and caulking applications requiring relatively thin, cured, elastomeric sections. For example, one package organopolysiloxane compositions convertible to the elastomeric state at room temperature can be advantageously utilized as window sealant for high altitude aircraft. It has been found however, that when the organopolysiloxane composition is cured in contact with the metal such as aluminum, the resulting rubber-metal bond is not sufficient to maintain a satisfactory cabin air pressure unless the metal has been previously primed with an organopolysiloxane resin. This procedure often proves to be unsatisfactory and time consuming, particularly where the shape of the metal substrate to be primed is irregular. As a result, the particular advantages achieved by employing fluid compositions curable at room temperature to the elastomeric state by exposure to moisture, are often not fully realized. In addition, the over all time needed to effect the formation of the rubber-metal bond is increased by the time needed to apply and dry the primer before the fluid organopolysiloxane composition is applied.

In copending application of C. L. Smith et al., Ser. No. 221,326, filed Sept. 4, 1962, and assigned to the same assignee as the present invention, there are described valuable single package fluid organopolysiloxane compositions comprised of a silanol chain-stopped polydiorganosiloxane, an organotriacyloxysilane and an alkoxy-stopped copolymer composed of chemically combined siloxy units having organo radicals attached to silicon. Although these compositions can be utilized directly on unprimed metal substrates to form satisfactory metal-rubber bonds at room temperature, after a 6 month shelf-period these fluid compositions often fail to cure satisfactorily. In order to fully satisfy many consumer applications requiring elaborate means of distribution, shelf period of at least two years or more are often mandatory. It would be desirable therefore to have one-package fluid organopolysiloxane composition curable at room temperature that formed a satisfactory metal-rubber bond when utilized after at least a two year shelf period.

The present invention is based on the discovery that a fluid composition comprising a mixture of an organotriacyloxysilane, and organosiloxane having chemically combined organosiloxy units, (1) $\qquad RSiO_{1.5}$ can be utilized directly at room temperature on a variety of metal substrates to form metal-rubber composites having superior bond strength, where R in Formula 1 is attached to silicon by carbon-silicon linkages and is a member selected from monovalent hydrocarbon radicals, halogenated monovalent hydrocarbon radicals and cyanoalkyl radicals. In addition, the fluid composition can be advantageously utilized after extended shelf periods of at least 2 years.

There is provided by the present invention, a fluid organopolysiloxane composition curable at room temperature to the elastomeric state which is formed by mixing under substantially anhydrous conditions, (A) a base mixture comprising organosiloxane selected from, (a) organosiloxane composed of chemically combined organosiloxy units of Formula 1 and diorganosiloxy units of the formula, (2) $\qquad (R)_2SiO$ and (b) organosiloxane composed of chemically combined organosiloxy units of Formula 1, diorganosiloxy units of Formula 2, and triorganosiloxy units of the formula, (3) $\qquad (R)_3SiO_{0.5}$ and (B), a curing agent having the formula, (4) $\qquad RSi(OCOR')_3$ utilized in combination with said base mixture in proportions of from 2% to 20% by weight of said organosiloxane, which contains from .02% to 2.0% by weight, based on the weight of said organosiloxane, of hydroxy radicals attached to silicon, R is defined above, the ratio of R radicals to silicon in said organosiloxane can have a value between 1.85 to 2, the ratio of the sum of R radicals and hydroxy radicals to silicon in said organosiloxane can have a value between 2.001 to 2.05, and R' is selected from hydrogen and a monovalent aliphatic radical.

Radicals included by R of the above formula are for example, aryl and halogenated aryl radicals such as phenyl, tolyl, chlorophenyl, naphthyl, etc.; aralkyl radicals such as phenylethyl, etc.; aliphatic, cycloaliphatic, and haloaliphatic, such as cyclohexyl, cyclobutyl, etc.; alkyl, alkenyl, and alkynyl such as methyl, ethyl, propyl, vinyl, allyl, trifluoroethyl, etc.; cyanoalkyl radicals such as cyanoethyl, cyanopropyl, cyanobutyl, etc. R in the above formulae can be the same radical or any two or more of the aforementioned R radicals. Radicals included by R' are alkyl radicals, such as methyl, ethyl, propyl, butyl, pentyl, octyl, etc. Preferably, R and R' are methyl.

The organosiloxane utilized in the base mixture of the fluid organopolysiloxane compositions of the present invention can be a mixture of ingredients of which there is present at least a major amount of chemically combined diorganosiloxy units of Formula 2, and a minor amount of organosiloxy units of Formula 1. Such mixture also can be composed of a major amount of chemically combined diorganosiloxy units of Formula 2, and a minor amount of chemically combined organosiloxy units of Formula 1, and triorganosiloxy units of Formula 3.

More particularly, the organosiloxane utilized in the fluid organopolysiloxane compositions of the present invention can consist of a mixture of 100 parts of a "base fluid" having a viscosity of about 300 to about 500,000 centipoises at 25° C., and 2 to 30 parts of a "process aid" having a viscosity of up to about 200 centipoises at 25° C. The base fluid is silanol chain-stopped and can be "linear," i.e., composed of chemically combined units of Formula 2, or "branched," i.e., composed of chemically combined units of Formulae 1 and 2. The process aid also can contain silanol, and can be composed of chemically combined units of Formulae 1, 2 and 3, chemically combined units of Formulae 2 and 3 chemically combined units of Formulae 1 and 2, or 1 and 3. Preferably the organosiloxane of the present invention is a mixture of the linear base fluid and the process aid composed of units of Formulae 1, 2 and 3. Another preferred mixture of organosiloxane is a mixture of the branched base fluid and process aid composed of chemically combined units of Formulae 1, 2 and 3, or 2 and 3.

The linear base fluid of the organosiloxane utilized in the present invention has the formula, (5)  $HO[-S\lambda O]_n H$ where $n$ is an integer equal to about 200 to 3,000, inclusive, and R is as defined above. This fluid preferably has a viscosity of from about 2,000 to about 50,000 centipoises when measured at 25° C. These fluids can be made by treating a polydiorganosiloxane such as a polydimethylsiloxane with water in the presence of a suitable acid or base catalyst to tailor the viscosity of the polymer to the desired range. Polydiorganosiloxanes which can be employed to make the base fluid of Formula 5 can be made by conventional equilibration procedures by heating a cyclopolydiorganosiloxane of the formula, (6)

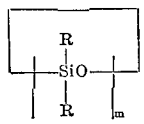

in the presence of a base catalyst such as potassium hydroxide, where R is as defined above, and $m$ is an integer equal to from 3 to 10, inclusive.

Water is added, for example, to a high molecular weight polydiorganosiloxane, the mixture heated to 150° C. to 200° C., and the mixture is then decatalyzed and stripped to the desired viscosity. Silanol chain-stopped polymers can be made having viscosities below 1200 centipoises by treating polydiorganosiloxanes with steam under pressure. Other methods that can be employed to make the linear base fluid of Formula 5, are more particularly described in Patent 2,607,792, Warrick and U.K. Patent 835,790.

Alternatively, the branched base fluid of the organosiloxane utilized in the practice of the present invention is composed of from .05 to 5 mole percent, and preferably from .05 to 1 mole percent of chemically combined units of Formula 1, based on the total moles of chemically combined units of Formulae 1 and 2; it has from .05% to 1.5% by weight based on the weight of branched base fluid of hydroxy radicals attached to silicon.

The branched base fluid can be made by equilibrating units of Formulae 1 and 2. One procedure for example, involves equilibrating with a catalyst such as KOH, a mixture of a cyclic shown by Formula 6 and an organotrialkoxysilane, for example, methyltriethoxysilane at a temperature of for example, between 100° C. to 250° C. The resulting equilibrate can be hydrolyzed to convert alkoxy to silanol, as well as introduce silanol into the resulting branched base fluid. The equilibration mixture then can be decatalyzed by use of stoichiometric amount of suitable acid such as phosphoric, and stripped to a desired final viscosity. Preferably, an amount of organotrialkoxysilane is utilized to provide at least one unit of Formula 1 per polymer molecule.

Another procedure that can be utilized in making the branched silanol chain-stopped base fluid is equilibrating organosiloxane composed of chemically combined units of Formulae 1 and 2 with a cyclic of Formula 6. Such organosiloxane can be employed as low viscosity silanol chain-stopped fluid such as between 5 centipoises to 3,000 centipoises at 25° C. It can be made by cohydrolyzing diorganodihalosilane and organotrihalosilane to form units of Formulae 2 and 1 respectively, followed by neutralizing the excess hydrolysis acid with an alkali bicarbonate.

As previously indicated, organasiloxane utilized in the base mixture can contain a process aid in addition to a base fluid. One of the preferred forms of the process aid that can be utilized with either the branched or linear base fluid, is a silanol-containing organosilicon material composed of chemically combined units of Formulae 1, 2 and 3. This process aid can be utilized at from 2 to about 30 parts, per 100 parts of the base fluid. The process aid preferably has a ratio of organosiloxy units of Formula 1, to diorganosiloxy units of Formula 2, having a value of from 0.11 to 0.36, and a ratio of triorganosiloxy units of Formula 3, to diorganosiloxy units of Formula 2 having a value of from .02 to .04. Preferably it has from 0.1 to 2 percent by weight of hydroxy radicals attached to silicon based on the weight of process aid.

The process aid composed of units of Formulae 1, 2 and 3 can be made by hydrolyzing a mixture of a diorganodihalosilane $R_2SiX_2$, an organotrihalosilane $RSiX_3$, and a triorganohalosilane $R_3SiX$, where R is as defined above, and X is a halogen radical such as chloro. It has been found expedient to maintain the concentration of effluent acid formed during the hydrolysis below about a 32% by weight of acid and preferably in a range of between about 28 to 32 percent by weight of acid. However, higher or lower concentrations of acid can be effectively utilized. If the hydrolysis is accomplished at a pH of 5, to about 7, by use of buffering agents such as alkali bicarbonates, process aid can be made having 8% or more by weight of hydroxy radicals attached to silicon. Preferably the hydrolysis is performed at a temperature below 30° C., but a temperature between 20 to 40° C. will provide for effective results. The hydrolyzate is then recovered from the acid layer and neutralized with a standard neutralizing agent such as alkali bicarbonate, for example, sodium bicarbonate, ammonia, etc.

Another form of process aid which can be utilized with the base fluid is a silanol-containing organosilicon material composed of chemically combined units of Formulae 2 and 3. This material also can be made by equilibration procedures. There can be utilized from 0.1 to 20 mole percent of units of Formula 3, and from 80 mole percent to 99.9 mole percent of units of Formula 2. It can contain from .01 to 8 weight percent hydroxy radicals attached to silicon based on the total weight of fluids.

In addition to the above-described process aids there also can be utilized organosilicon materials composed of chemically combined units of Formulae 1 and 3, or chemically combined units of Formulae 1 and 2. The latter process aid also can contain up to 8 weight percent of hydroxy radicals attached to silicon.

The curing agent of Formula 4 is an organotriacyloxy silane which can be made by conventional procedures such as reacting an organotrihalosilane, and an acyl acid anhydride as shown in C. Eaborn, Organosilicon Compounds, Butterworth's Scientific Publication, London (1960) on p. 312. For example, a mixture of methyltrichlorosilane and acetic anhydride is allowed to stand for an extended period of time, or refluxed for a few hours. The final product can be recovered by removing the resulting acyl halide by distillation. Other procedures that can be employed to make the curing agent include reacting an alkali metal salt of the corresponding acid with a chlorosilane. For example, sodium formate plus methyltrichlorosilane forms methyltriformoxysilane. In addition to formyl and acetyl radicals, the curing agent can be substituted with other acyl radicals such as propionyl, butyryl, hexoyl, etc. radicals.

Various fillers and pigments can be incorporated in the fluid organopolysiloxane compositions of the present invention. Among such materials are for instance, titanium dioxide, zirconium silicate, silica aerogel, iron oxide, diatomaceous earth, fumed silica, precipitated silica, glass fibers, polyvinylchloride, ground quartz, etc. The amounts of filler used can obviously be varied within wide limits in accordance with the intended use. For example, in some sealant applications, the fluid compositions of the present invention can be employed free of filler. In other applications, such as the employment of the fluid compositions for making binding material, as much as 700 parts or more of filler per 100 parts of organosiloxane can be used. In such applications the filler can consist of a major amount of extending materials, such as ground quartz, polyvinyl chloride, etc. or mixtures thereof, preferably having an average particle size in the range of about from 1 to 10 microns. Other applications for which compositions of the present invention can be employed are as construction sealants, caulking compounds, etc. The exact amount of filler therefore, will depend upon such factors as the application for which the organopolysiloxane composition is intended, the type of filler utilized, (that is density of the filler, its particle size), etc. Preferably, a proportion of from 10 to 300 parts of filler, and from 15 to 25 parts of silica filler, per 100 parts of organosiloxane, is utilized; a proportion of up to about 50 parts or more of silica filler will provide for effective results. In addition, the fluid organopolysiloxane compositions of the present invention also can contain curing accelerators such as dibutyltindilaurate, carboxylic acids, salts of lead, zinc, etc.

In the practice of the invention, a fluid organopolysiloxane composition curable at room temperature to the elastomeric state can be made by forming a mixture of the base mixture which can consist of the organosiloxane, filler, pigment, curing accelerator, etc., and the curing agent. The order of addition of the various ingredients is not critical. For example, the curing agent can be mixed directly with the organosiloxane followed by addition of filler, or the curing agent can be added to the mixture of the filler and the organosiloxane, etc.

In mixing the various ingredients together, to form the fluid organopolysiloxane composition, mixing must be accomplished under substantial anhydrous conditions. Optimum results are obtained, for example if the ingredients to which the curing agent is added, have no more than 100 parts of water per million parts of the resulting mixture. Preferably mixing is accomplished at a temperature between 20° C. to 80° C.

After the fluid organopolysiloxane composition is made, it can be stored for a substantial period of time if it is properly sealed from moisture. If the fluid organopolysiloxane mixture is stored under sealed condition at temperatures between 0° C. to 60° C., it will remain in a fluid curable state for a period of at least 2 years.

In order that those skilled in the art will be better able to practice the invention, the following examples are given by way of illustration and not by way of limitation. All parts are by weight.

EXAMPLE 1

A fluid organopolysiloxane composition was made by mixing under an anhydrous nitrogen atmosphere, 100 parts of a silanol chain-stopped polydimethylsiloxane having a viscosity of about 10,000 centipoises at 25° C., 21 parts of fumed silica filler, 0.5 part of titanium oxide, 15 parts of process aid, 5 parts of methyltriacetoxysilane, and 0.1 part of dibutyltindilaurate.

The process aid was composed of 2.9 mole percent of trimethylsiloxy units, chemically combined with 19.9 mole percent of methylsiloxy units, and 77.2 mole percent of dimethylsiloxy units. It also had 0.5 percent by weight of hydroxy radicals attached to silicon based on the weight of process aid.

The process aid is made by cohydrolyzing 2.9 moles of trimethylchlorosilane, 19.9 moles of methyltrichlorosilane and 77.2 moles dimethyldichlorosilane at a temperature of 20° C. to 30° C. The resulting cohydrolyzate is separated from the hydrolysis mixture and neutralized with sodium bicarbonate.

EXAMPLE 2

A fluid organopolysiloxane composition is prepared in accordance with the procedure of Example 1, composed of 100 parts of a silanol chain-stopped polydimethylsiloxane having a viscosity of about 1,000 centipoises at 25° C., 20 parts of fumed silica, 100 parts of polyvinyl chloride having an average particle size of less than about 10 microns, 15 parts of a process aid, 8 parts of methyltriacetoxysilane, and 0.1 part of dibutyltindilaurate. The process aid is composed of 40 mole percent of methylsiloxy units, chemically combined with 30 mole percent of dimethylsiloxy units, and 30 mole percent of trimethylsiloxy units. It also contains 2% by weight of hydroxy radicals attached to silicon based on the weight of the process aid.

EXAMPLE 3

A fluid organopolysiloxane composition was made by mixing together at room temperatures under substantially anhydrous conditions, 100 parts of a branched silanol chain-stopped base fluid composed of 99.85 mole percent of dimethylsiloxy units chemically combined with 0.15 mole percent of methylsiloxy units, 21 parts of fumed silica filler, 0.5 part of titanium oxide, 0.01 part of dibutyltindilaurate, 5 parts of methyltriacetoxysilane, and 7.2 parts of the process aid utilized in Example 1.

The branched base fluid was made by equilibrating a mixture of 591.4 parts of octamethylcyclotetrasiloxane and 17 parts of an organosilicon material having a viscosity of about 10 centipoises at 25° C. and composed of about 7 mole percent of methylsiloxy units chemically combined with 93 mole percent of dimethylsiloxy units and about 0.2 weight percent of hydroxy radicals attached to silicon based on the weight of the organosilicon material. There was utilized .0015 percent by weight of KOH based on the weight of the equilibration mixture; the mixture was equilibrated at a temperature between 150° C. to 160° C. over a period of 5 hours. During the equilibration, water was added to the mixture. The mixture was decatalyzed with phosphoric acid and stripped to a viscosity of about 10,000 centipoises at 25° C.

EXAMPLE 4

A fluid organopolysiloxane composition is prepared composed of 5 parts of methyltriacetoxysilane and 100 parts of a curable base mixture. The curable base mixture consists of 30 parts of fumed silica and 70 parts of methylsiloxane having a ratio of about 1.93 methyl radicals per silicon atom. In addition, the fluid organopolysiloxane composition contains .01 part of lead octoate.

The methylsiloxane is made by mixing together 100 parts of a branched silanol chain-stopped base fluid composed of 5.0 mole percent of methylsiloxy units chemically combined with 95 mole percent dimethylsiloxy units. The organosiloxane also contains 30 parts of process aid composed of 21.9 mole percent of trimethylsiloxy units, 37.8 mole percent of methylsiloxy units, 40.3 mole percent dimethylsiloxane units and 3.1 weight percent of hydroxy radicals attached to silicon. The branched silanol chain-stopped base fluid is made in accordance with the procedure of Example 3 except that a mixture of 428 parts of the organosilicon material is equilibrated with 172 parts of octamethylcyclotetrasiloxane. The process aid is made by cohydrolyzing methyltrichlorosilane, trimethylchlorosilane, and dimethyldichlorosilane, separating the resulting cohydrolyzate from the resulting hydrolysis mixture and treating it with an alkali bicarbonate.

EXAMPLE 5

A fluid organopolysiloxane composition is prepared by mixing under an atmosphere of dry nitrogen, 100 parts of branched silanol chain-stopped base fluid having a viscosity of about 500,000 centipoises at 25° C., 15 parts of fumed silica, 5 parts of methyltriacetoxysilane, and 20 parts of a process aid. The base fluid is composed of 1 mole percent of methylsiloxy units chemically combined with 99 mole percent of dimethylsiloxy units. The process aid is composed of 3 mole percent of trimethylsiloxy units chemically combined with 97 mole percent of dimethylsiloxy units, and 0.4% by weight based on the weight of a process aid of hydroxy radicals attached to silicon.

There were also prepared prior art fluid organopolysiloxane compositions curable at room temperature to the elastomeric state. The compositions are taught in U.K. Patent 791,370 and Example 11 of Patent 3,035,016, Bruner. The fluid organopolysiloxane mixture prepared in accordance with the U.K. patent consisted of 100 parts of the silanol chain-stopped polydimethylsiloxane of Example 1 above, 20 parts of fumed silica filler and 5 parts of methyltriacetoxysilane.

The table below shows physical properties of slabs molded from various fluid organopolysiloxane compositions by exposing them to the atmosphere for 48 hours at 25° C. The compositions of Example 1 and Example 3 of the present invention are shown respectively as "composition (1)," and "composition (3)." There is also shown the composition of "Bruner." The composition of the U.K. patent is shown as "U.K."; "U.K.+primer" indicates that an organopolysiloxane resin was employed as a primer in measuring shear strength. This resin is shown in Patent 2,643,964, Smith-Johannsen, assigned to the same assignee as the present invention.

In the table, "Shear Strength" (p.s.i.) was measured on a Tinius-Olsen tester at a rate of 0.5 inch per minute. In measuring shear, the fluid composition is spread on an aluminum panel to a height of about .02 inch, a section of wire mesh screen is imbedded in the fluid, and the wire mesh screen is again covered with the fluid to about an equivalent height. After the fluid mixture cures for 48 hours under atmospheric conditions, there is measured the force required to pull the aluminum panel and the screen apart at the above rate. With respect to U.K.+primer, a primed aluminum panel was used; the primer was allowed to dry in air. In the table, physical properties of the cured test slabs also are shown, where "H" (Hardness) is measured in Shore A, "T" (Tensile) p.s.i., and "E" (Elongation) is in percent.

TABLE

| | Shear Strength | 48 Hrs./25° C. | | |
|---|---|---|---|---|
| | | H | T | E |
| Composition (1) | 154 | 37 | 350 | 410 |
| Composition (3) | 168 | 27 | 430 | 350 |
| Bruner | 87 | | | |
| U.K. | 66 | 45 | 348 | 270 |
| U.K. plus primer | 130 | | | |

The above results show that the fluid organopolysiloxane compositions prepared in accordance with the teaching of the present invention, form stronger rubber-aluminum bonds than the prior art mixtures. Also sigificant is that the rubber-aluminum bond made from the U.K. composition and primed aluminum panel is weaker than the bonds formed from either of the fluid compositions of the invention without a primer. In addition, the physicals of the compositions of the present invention are superior to the U.K. composition with respect to elongation, and tensile.

The fluid compositions shown in Examples 2, 4, and 5 of the present invention also cure satisfactorily to the elastomeric state. It also is found that rubber-aluminum composites made from these compositions without primer, also have shear strength substantially better than the unprimed Bruner and U.K. composition.

One skilled in the art would know that the fluid organopolysiloxane compositions of the present invention re-
present a significant advance over those shown by the prior art. For example, the elastomeric forming organopolysiloxane compositions of the prior art, free of the units shown by Formula 1, cannot be utilized in a variety of sealing, caulking, or binding applications without the employment of a primer. The advantages achieved by the fluid compositions of the present invention provide for significant advantages in applications requiring a material possessing the properties of organopolysiloxanes curable at room temperature, which bonds to a variety of substrates without the employment of a primer. In addition, the elastomers produced thereby exhibit all the outstanding properties exhibited by organopolysiloxane elastomers, such as superior resistance to oxidation, heat-age, outstanding toughness, etc.

While the foregoing examples have of necessity been limited to only a few of the very many variables within the scope of the present invention, it should be understood that the present invention covers a much broader class of fluid compositions formed by mixing an organotriacyloxysilane with a curable base mixture comprising organosiloxanes having chemically combined units of Formulae 1 and 2, or 1, 2 and 3. All of these materials are prepared by methods specifically illustrated in the examples above and described further in the foregoing description of the present invention.

What I claim as new and desire to secure by Letters Pattern of the United States is:

1. A substantially anhydrous organopolysiloxane composition curable at room temperature to the elastomeric state upon exposure to moisture comprising (A) 100 parts of a silanol chain-stopped organopolysiloxane consisting essentially of chemically combined diorganosiloxy units of the formula:

$(R)_2SiO$ 

(B) from about 2 to 20 parts of a curing agent of the formula:

$RSi(OCOR')_3$ 

and (C) 2 to 30 parts of an organosilicon process aid composed of diorganosiloxy units of (A) chemically combined with organosiloxy units of the formula:

$RSiO_{1.5}$ 

and triorganosiloxy units of the formula:

$(R)_3SiO_{0.5}$ 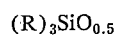

where said organosilicon process aid has from 0.1 percent to 8 percent by weight of hydroxy radicals attached to silicon, and a ratio of organosiloxy units to diorganosiloxy units of from about 0.11 to 1.4 inclusive, and a ratio of triorganosiloxy units to diorganosiloxy units of from about 0.02 to about 1 inclusive, R is a member selected from the class consisting of monovalent hydrocarbon radicals, halogenated monovalent hydrocarbon radicals and cyanoalkyl radicals, and R' is a member selected from the class consisting of hydrogen and a monovalent aliphatic radical.

2. An organopolysiloxane composition in accordance with claim 1, where the silanol chain-stopped organopolysiloxane has the formula,

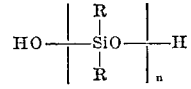

where R is a member selected from the class consisting of monovalent hydrocarbon radicals, halogenated monovalent hydrocarbon radicals and cyanoalkyl radicals, and $n$ is an integer equal to about 200 to 3,000, inclusive.

3. An organopolysiloxane composition in accordance with claim 1, where said organosilicon process aid has a ratio of said organosiloxy units to said diorganosiloxy units which has a value of from about 0.11 to about 0.36, inclusive, and a ratio of said triorganosiloxy units to said diorganosiloxy units which has a value of from about 0.02 to about 0.04, inclusive.

4. An organopolysiloxane composition in accordance with claim 1, where R and R' are methyl.

5. An organopolysiloxane composition in accordance with claim 1, where said curing agent is methyltriacetoxysilane.

6. An organopolysiloxane composition in accordance with claim 1 which contains a silica filler.

7. A substantially anhydrous organopolysiloxane composition curable at room temperature to the elastomeric state upon exposure to moisture comprising (A) 100 parts of a silanol chain-stopped polydimethylsiloxane, (B) 2 to 20 parts of methyltriacetoxysilane, and (C) 2 to 30 parts of a methylsiloxane process aid having from 0.1 percent to 2 percent by weight of hydroxy radicals attached to silicon and composed of chemically combined methylsiloxy units, dimethylsiloxy units and trimethylsiloxy units, where the ratio of said methylsiloxy units to said dimethylsiloxy units has a value of from 0.1 to 0.36 inclusive, and the ratio of trimethylsiloxy units to said dimethylsiloxy units has a value of from 0.02 to 0.04 inclusive.

References Cited

UNITED STATES PATENTS

| 2,502,286 | 3/1950 | Sowa | 260—46.5 |
| 3,035,016 | 3/1962 | Brunner | 260—46.5 |
| 3,127,363 | 3/1964 | Nitzsche et al. | 260—37 |
| 3,238,157 | 3/1966 | Smith | 260—37 |
| 3,293,204 | 12/1966 | Smith et al. | 260—37 |

MORRIS LIEBMAN, *Primary Examiner.*

J. H. DERRINGTON, *Assistant Examiner.*